United States Patent [19]

Brüssow et al.

[11] Patent Number: 4,738,560
[45] Date of Patent: Apr. 19, 1988

[54] WELDING SEAM FOR THE CONNECTION OF TWO THIN SHEET METAL MEMBERS

[75] Inventors: Gerhard Brüssow; Alfred Rüger; Dieter König, all of Munich, Fed. Rep. of Germany

[73] Assignee: Bayerische Motoren Werke AG, Munich, Fed. Rep. of Germany

[21] Appl. No.: 786,117

[22] Filed: Oct. 10, 1985

[30] Foreign Application Priority Data

Oct. 12, 1984 [DE] Fed. Rep. of Germany ....... 3437438

[51] Int. Cl.$^4$ ............................................. B25G 3/34
[52] U.S. Cl. ..................... 403/268; 403/271; 403/272; 219/86.9; 228/137
[58] Field of Search ............ 228/137, 15, 113, 5, 228/173.6; 403/268, 265, 270, 271, 272; 219/86.9

[56] References Cited

U.S. PATENT DOCUMENTS

| 685,975 | 11/1901 | Cowles ............................ 228/137 |
| 2,255,658 | 9/1943 | Friedman ...................... 228/137 X |
| 2,354,921 | 8/1944 | McClary . |
| 2,591,994 | 8/1952 | Alexander ....................... 228/137 |
| 2,714,447 | 8/1955 | Gardes ........................... 228/136 X |
| 2,723,445 | 11/1955 | Trautvetler ................. 228/173.6 X |
| 3,115,572 | 12/1963 | Taschinger . |
| 3,407,280 | 10/1968 | Mitchell, Jr. et al. . |
| 3,769,686 | 11/1973 | Massey ........................... 228/137 |
| 4,187,407 | 2/1980 | Marko, Jr. ...................... 403/271 |
| 4,227,824 | 10/1980 | Ikawa ............................. 403/271 |
| 4,415,387 | 11/1983 | Newman ...................... 403/268 X |
| 4,427,869 | 1/1984 | Kimura et al. ............... 219/86.9 X |
| 4,470,717 | 9/1984 | Bruhnke et al. ............. 228/136 X |

FOREIGN PATENT DOCUMENTS

| 1739712 | 12/1956 | Fed. Rep. of Germany . |
| 1201125 | 9/1965 | Fed. Rep. of Germany . |
| 1961728 | 3/1967 | Fed. Rep. of Germany . |
| 2448713 | 4/1976 | Fed. Rep. of Germany . |
| 2653060 | 5/1978 | Fed. Rep. of Germany . |

OTHER PUBLICATIONS

VDI Publication, Laser-Materialbearbeitung; Jun. 1, 1984; pp. 9–12.
Die Verfahren der Schweisstechnik Publication; 1974; 3 pages.
Elektro–Nachrichten Publication; Jun. 1965; pp. 8–9.

*Primary Examiner*—Thomas F. Callaghan
*Attorney, Agent, or Firm*—Barnes & Thornburg

[57] ABSTRACT

A connection of an outer sheet metal member with an inner sheet metal member whereby the outer sheet metal member must form an optically smooth surface. For that purpose, the outer sheet metal member is folded over the inner sheet metal member and a welding seam is then made from the folded-over side by means of a low energy welding process, for example, special forms of the protective gas welding or energy beam welding, and more particularly in such a manner that only the folded-over part of the outer sheet metal member and the inner sheet metal member fuse. The non-folded-over side of the outer sheet metal member thereby shows no impairment whatsoever by the welded connection.

9 Claims, 1 Drawing Sheet

WELDING SEAM FOR THE CONNECTION OF TWO THIN SHEET METAL MEMBERS

BACKGROUND OF THE INVENTION

The present invention relates to a welding seam for the connection of two thin sheet metal panels of which one sheet metal panel forms an optically smooth outer surface, for example, of inner sheet metal panels with outer sheet metal panels for doors, hoods, lids and the like in motor vehicles.

DESCRIPTION OF THE RELATED ART

A motor vehicle door is disclosed in the DE-OS No. 26 53 060 in which the inner door sheet metal member is connected with the outer door sheet metal member by spot-welding. For that purpose, both sheet metal members are flanged over in their edge area, and more particularly in such a manner that the optically visible welding spots are not located on the outside of the door in the closed condition of the door. By reason of the used spot-welded connection with the relatively large heat development, a warping or distortion of the individual sheet metal members cannot be prevented. For that reason, the flanged-over sheet metal parts are also relatively long in the DE-OS No. 26 53 060 in order to prevent that the distortion appears on the door outside in the form of waves.

Additionally, it is generally known to manufacture inner and outer sheet metal members of doors, hoods and lids in the automobile construction by folding over the sheet metal member forming the outside of the door and by subsequent adhesive connection of the two sheet metal members. Both the requisite structural rigidity as also a corrosion protection in the fold is achieved by the adhesive. By the use of precoated sheet metal members, the necessity of the corrosion protection can at present be dispensed with so that adhesive connections are no longer required. The further use of folded connections, however, continues to be desirable with a view toward the painting operations because fewer edges result therewith at which the paint film forms extraordinarily thinly by reason of the surface stresses so that even smallest paint damages lead directly to the corrosion at the sheet metal member.

SUMMARY OF THE INVENTION

It is the object of the present invention to provide a welding seam for the connection of two thin sheet metal members which can dispense with the spatially unfavorable flange seam that is difficult to paint.

The underlying problems are solved according to the present invention in that the sheet metal member forming the outer surface is folded about the sheet metal member forming the inner surface within the edge area and the welding takes place on the folded side by means of low energy welding processes in such a manner that only the folded-over sheet metal part is welded together with the inner sheet metal part surrounded thereby. By reason of the use of low energy welding processes such as, for example, microplasma welding, short duration-WIG-welding, short duration-MAG-welding and laser beam or electron beam-welding, the advantage is achieved that the welding does not extend to the outside of the outer sheet metal member and forms thereat a welding seam or welding nugget. One obtains thereby an optically smooth outer sheet metal member notwithstanding use of a folding. The distortion which occurs also with these low energy welding processes has no effect on the outer sheet metal member because a sort of spring element results in the bent outer sheet metal area owing to the folding of the outer sheet metal member about the inner sheet metal member, which absorbs the minimal distortion in the welding seam area and fails to transmit the same onto the sheet metal outside. The preservation of the form of the sheet metal parts as used heretofore offers the advantage that the existing tools and stamping dies can be continued to be used. The sheet metal panels may be connected in accordance with the present invention by individual welding spots, by an interrupted welding seam or by welding seams provided only in the edge area. Consideration should be given in connection therewith that conventionally precoated sheet metal members are used so that a corrosion protection can be dispensed with. For that reason, it is no longer necessary to establish a continuous, uninterrupted seam. Depending on the requisite rigidity of the connection, also individual welding spots or a quilted seam or only short welded seams in the edge areas of the sheet metal members are suitable.

According to another feature of the present invention, a 100% safe tightness can be achieved notwithstanding the interrupted welding seams in that an additional material is placed into the fold during the folding operation which melts under the local heat interaction of the welding and securely closes off the joint. For example, solder is such a material which may be used for that purpose.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein.

DESCRIPTION OF THE PREFERRED EMBODIMENTS

Figure 1:
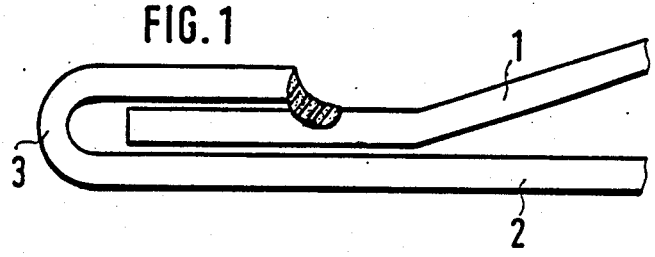
FIG. 1 is a somewhat schematic elevational view of a first embodiment of a welding seam in accordance with the present invention obtained by microplasma welding.

Referring now to the drawing wherein like reference numerals are used throughout the various views, in all three illustrated embodiments, an inner sheet metal member 1 is connected with an outer sheet metal member 2. For that purpose, the outer sheet metal member 2 is folded over the inner sheet metal member 1 in its edge area 3. By reason of the folding over, the outer sheet metal member 2 has elastic properties within the bent area, as a result of which the distortion will be absorbed which still occurs with the use of low energy and therewith low distortion welding processes as proposed by the present invention. The welding operation itself is so undertaken that only the folded-over part of the outer sheet metal member is connected with the inner sheet metal member, as a result of which, no impairment by the welding operation can be noticed on the outer surface of the outer sheet metal member.

Figure 2:
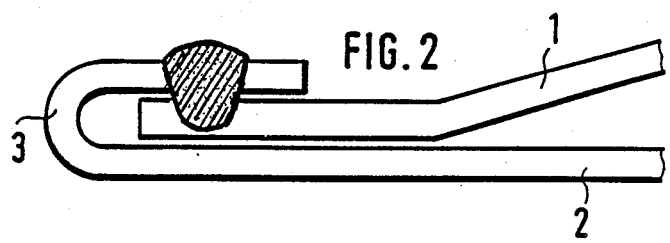
FIG. 2 is a somewhat schematic elevational view of a welding seam in accordance with the present invention obtained by MAG-welding.
Figure 3:
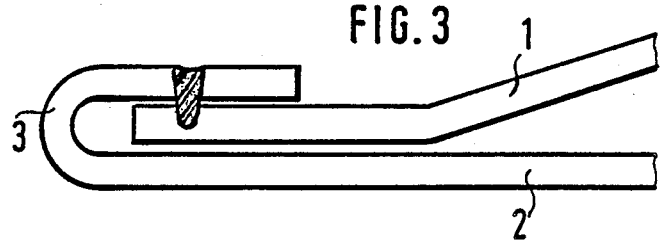
FIG. 3 is a somewhat schematic elevational view of a welding seam obtained in accordance with the present invention, obtained with the use of beam welding.

FIG. 1 illustrates the weld nugget in the manufacture by the use of microplasma welding. FIG. 2 illustrates the welding seam obtaint by MAG-welding and FIG. 3 by the use of beam welding.

Figure 4:
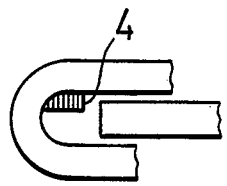
FIG. 4 is a schematic view showing additional sealing material added to the weld seam.

FIG. 4 shows additional material 4 such as solder which is inserted into the fold during the folding operation and which melts under the local heat interaction of the welding and securely closes off the joint.

While we have shown and described several embodiments in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim:

1. A welded seam for the connection of two relatively thin sheet metal members of which one forms an optically smooth outer surface, in which the sheet metal member forming the outer surface is folded in the edge area about the other sheet metal member forming an inner surface, and in which the welding takes place on the folded-over area by means of low energy welding processes such as microplasma welding, short duration WIG or MAG welding, laser beam or electron beam welding in such a manner that only the folded-over area of the outer sheet metal member is welded together with a flat portion of the inner sheet metal member about which the outer member was folded over such that the unfolded portion of the outer member retains its smooth outer surface opposite the point of welding.

2. A welding seam according to claim 1, wherein the sheet metal members are connected by individual welding spots.

3. A welding seam according to claim 1, wherein the sheet metal members are connected by an interrupted welding seam.

4. A welding seam according to claim 1, wherein the sheet metal members are connected by welding seams only within the area between the fold and an end of the folded over area.

5. A welding seam according to claim 1, wherein a readily fusing additional material is placed into the fold.

6. A welding seam according to claim 5, wherein the sheet metal members are connected by individual welding spots.

7. A welding seam according to claim 5, wherein the sheet metal members are connected by an interrupted welding seam.

8. A welding seam according to claim 5, wherein the sheet metal members are connected only within the area between the fold and an end of the folded over area by welding seams.

9. A welding seam according to claim 1, wherein the sheet metal members form inner and outer panels for doors, hoods, and lids in motor vehicles.

* * * * *